United States Patent [19]
Olson

[11] Patent Number: 5,556,124
[45] Date of Patent: Sep. 17, 1996

[54] AIR BAG MODULE

[75] Inventor: Mark O. Olson, Waterford, Mich.

[73] Assignee: TRW Vehicle Safety Systems Inc., Lyndhurst, Ohio

[21] Appl. No.: 377,475

[22] Filed: Jan. 24, 1995

[51] Int. Cl.$^6$ ................................................ B60R 21/20
[52] U.S. Cl. .................................. 280/728.2; 280/728.1
[58] Field of Search ............................. 280/728.1, 728.1

[56] References Cited

U.S. PATENT DOCUMENTS

| | | | |
|---|---|---|---|
| 4,698,107 | 10/1987 | Goetz et al. | 280/728.1 |
| 5,069,480 | 12/1991 | Good | 280/728.2 |
| 5,263,739 | 11/1993 | Webber et al. | 280/728 |
| 5,326,131 | 7/1994 | Yokota et al. | 280/728.1 |
| 5,332,256 | 7/1994 | Lauritzen et al. | 280/728.2 |
| 5,366,240 | 11/1994 | Hanabusa et al. | 280/728.2 |

FOREIGN PATENT DOCUMENTS

| | | | |
|---|---|---|---|
| 5-193432 | 8/1993 | Japan | 280/728.2 |
| 94/25313 | 11/1994 | WIPO | 280/728.2 |

*Primary Examiner*—Eric D. Culbreth
*Attorney, Agent, or Firm*—Tarolli, Sundheim, Covell, Tummino & Szabo

[57] ABSTRACT

An air bag module (10) includes a housing (12) having a main body portion (14) and two end plates (16, 18). A retaining ring (30) is assembled into the housing (12) through a deployment opening (150) in the housing. Fasteners (190–196) on the retaining ring (30), along with fastener (166) on an inflator (20), secure the end plates (16, 18) to the main body portion (14) of the housing (12).

13 Claims, 5 Drawing Sheets

5,556,124

AIR BAG MODULE

BACKGROUND OF THE INVENTION

1. Technical Field

The present invention relates to a vehicle occupant safety apparatus, and particularly relates to an air bag module including a housing, an inflator, and a retaining ring for securing an air bag to the housing.

2. Description of the Prior Art

A typical air bag module includes an air bag, an inflator for inflating the air bag, and a housing which contains the air bag and the inflator. A retaining ring secures the air bag to the housing. In the event of a vehicle collision, the inflator is actuated to direct inflation fluid into the air bag. The air bag inflates into a position to restrain the vehicle occupant from forcefully striking parts of the vehicle.

SUMMARY OF THE INVENTION

The present invention is a vehicle occupant safety apparatus comprising a housing including a main body portion and first and second end plates together defining a chamber in the housing. The housing has an axis extending between the end plates. An inflatable vehicle occupant restraint is located in the chamber for, when inflated, restraining an occupant of a vehicle. A retainer secures the inflatable vehicle occupant restraint in the chamber. The apparatus includes an inflator for, when actuated, inflating the inflatable vehicle occupant restraint. The inflator includes first fastener means for securing the inflator to at least one of the end plates of the housing with the inflator disposed between the end plates. The retainer includes second fastener means for securing the end plates to the main body portion of the housing with the retainer disposed between the end plates. The retainer is connected with the inflatable restraint and is movable with the inflatable restraint through the deployment opening into the chamber in the housing to position the inflatable restraint in the housing between the first and second end plates.

BRIEF DESCRIPTION OF THE DRAWING

The foregoing and other features of the present invention will become apparent to one skilled in the art to which the present invention relates upon consideration of the following description of the invention with reference to the accompanying drawings, wherein.

DESCRIPTION OF PREFERRED EMBODIMENT

Figure 1:
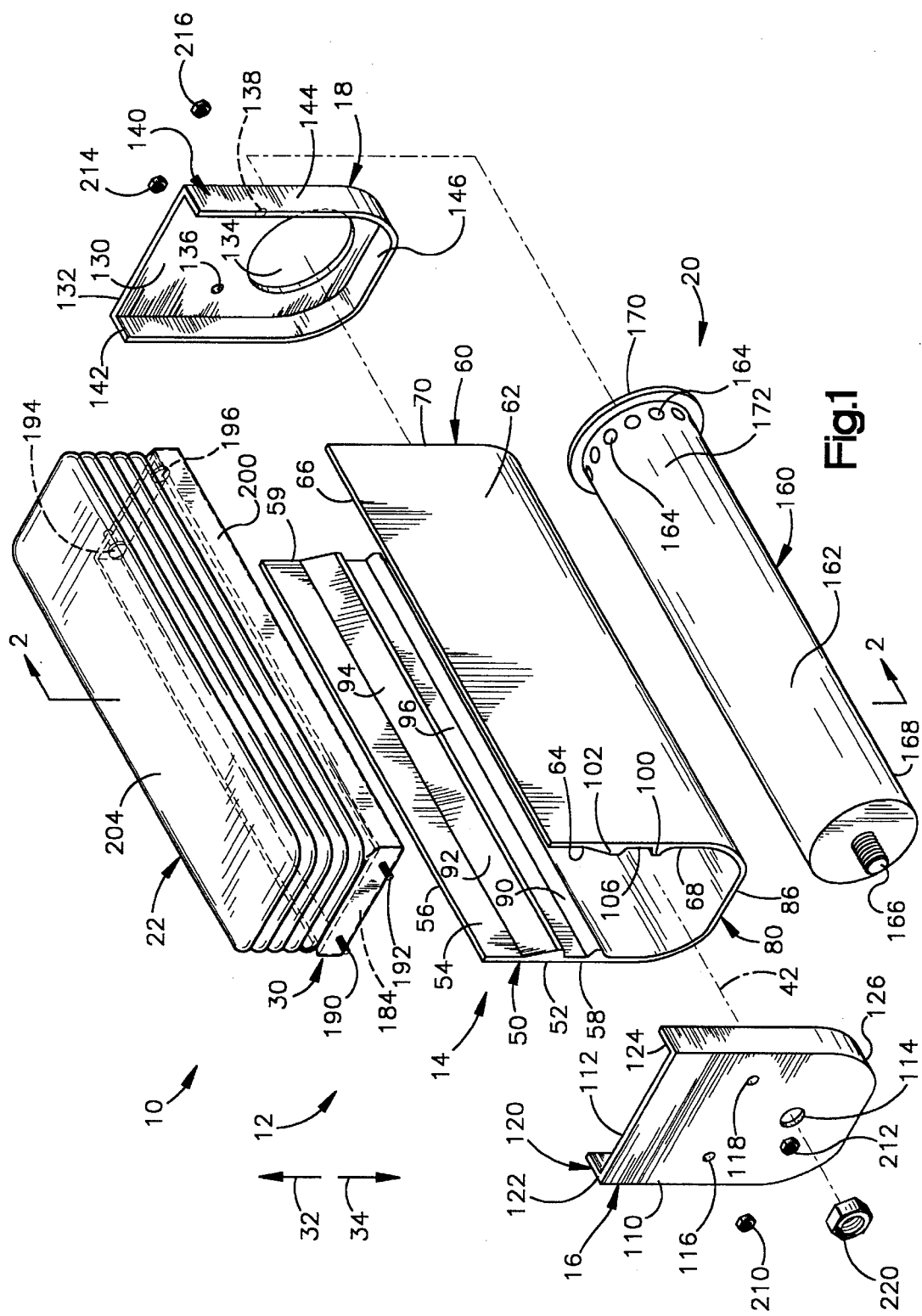
FIG. 1 is an exploded perspective view of a vehicle safety apparatus which is constructed in accordance with the present invention.

The present invention relates to a vehicle safety apparatus and particularly relates to a vehicle safety apparatus including an inflatable vehicle occupant restraint which is inflated to protect an occupant of a vehicle in the event of a vehicle collision. The present invention is applicable to various vehicle safety apparatus constructions. As representative of the present invention, FIG. 1 illustrates a vehicle safety apparatus comprising an air bag module 10.

The air bag module 10 includes a housing 12 having a main body portion 14 and two end plates 16 and 18. The module 10 also includes an inflator (i.e., a source of inflation fluid) 20, an air bag 22, and a retainer or retaining ring 30. The module 10 is mounted in an instrument panel of a vehicle (not shown) so that the left portion (as viewed in FIG. 2) of the module 10 is disposed in the vehicle at a location forward of the right portion (as viewed in FIG. 2) of the module. The air bag 22, when inflated, deploys in a rearward direction 32 (i.e., to the right as viewed in FIG. 2) to restrain a vehicle occupant. The forward direction in the vehicle is indicated by the arrow 34.

The three portions 14, 16 and 18 of the housing 12 together define a chamber 40 (FIG. 2) in the housing. An axis 42 (FIGS. 1 and 2) of the module 10 extends longitudinally between the end plates 16 and 18 of the housing 12. The housing 12 includes mounting brackets or other structure (not shown) for securing the housing to the vehicle in any known manner.

The main body portion 14 (FIG. 1) of the housing 12 is made from metal and is preferably an aluminum or magnesium extrusion. The main body portion 14 includes a generally planar upper wall 50 which extends parallel to the axis 42. The upper wall 50 has an outer side surface 52, an inner side surface 54, and a rear edge portion 56. The upper wall 50 also has first and second opposite end portions 58 and 59 (FIG. 1) located adjacent the end plates 16 and 18, respectively.

A generally planar lower wall 60 of the main body portion 14 is spaced from and extends parallel to the upper wall 50 and to the axis 42. The lower wall 60 has an outer side surface 62 (FIG. 2), an inner side surface 64 and a rear edge portion 66. The lower wall 60 also has first and second opposite end portions 68 and 70 (FIG. 1) located adjacent the end plates 16 and 18, respectively.

Figure 2:
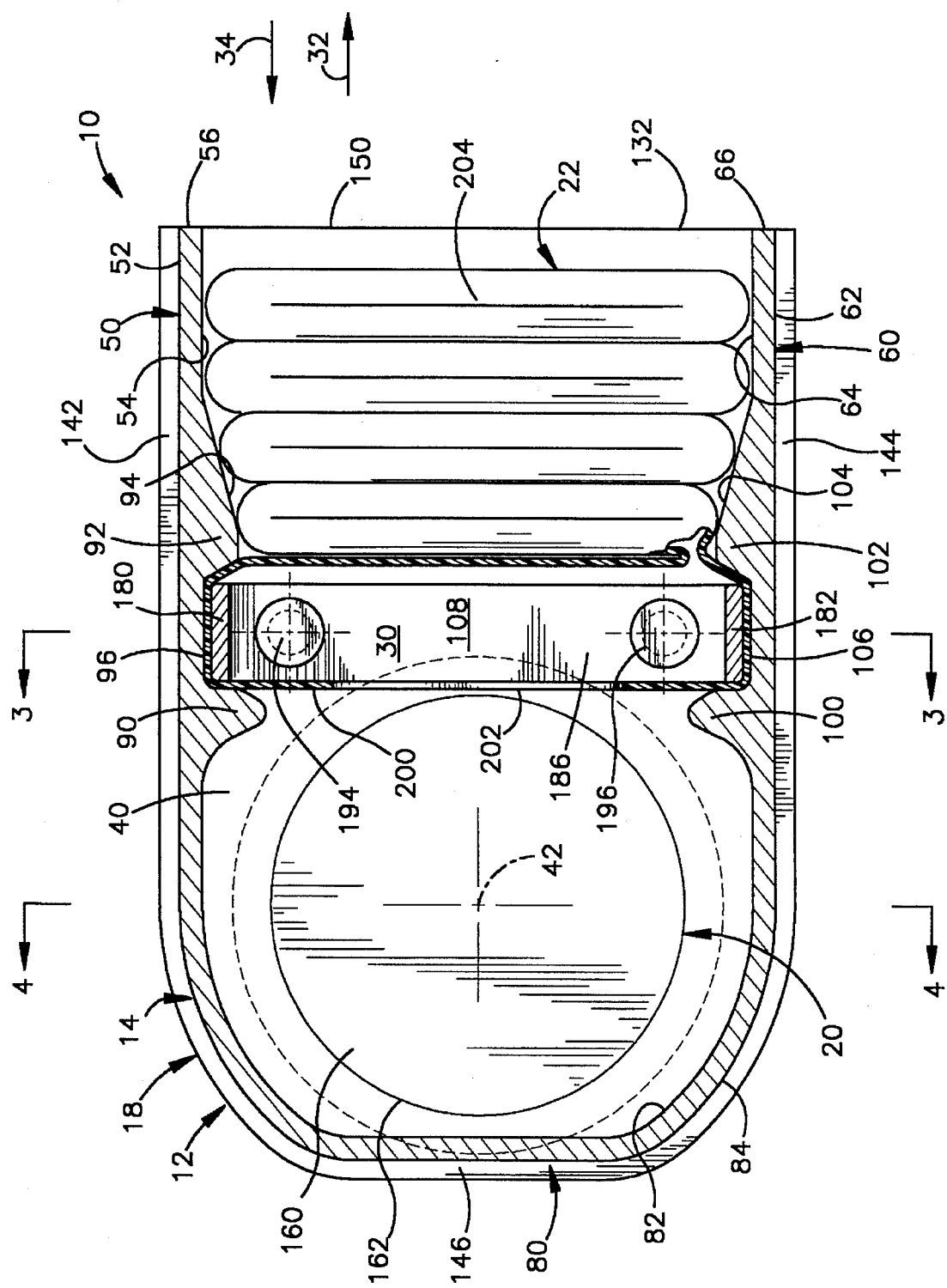
FIG. 2 is a sectional view of the vehicle safety apparatus of FIG. 1 in an assembled condition.

The main body portion 14 of the housing 12 further includes a generally arcuate central wall 80 extending between and interconnecting the upper wall 50 and the lower wall 60 to form a C-shaped cross-sectional configuration as shown in FIG. 2. The central wall 80 has an inner side surface 82 and an outer side surface 84. The central wall 80 also has a first end portion 86 and an opposite second end portion (not shown) located adjacent the end plates 16 and 18, respectively.

An inner rib 90 and an outer rib 92 project inward from the plane of the upper wall 50 of the main body portion 14 of the housing 12. The inner rib 90 is located between the central wall 80 and the outer rib 92. The outer rib 92 has a cam surface 94 which forms a portion of the inner side surface 54 of the upper wall 50. The inner rib 90 and the outer rib 92 define between them a U-shaped channel portion 96 on the inner side surface 54 of the upper wall 50.

An inner rib 100 and an outer rib 102 project inward from the plane of the lower wall 60 of the main body portion 14 of the housing 12. The inner rib 100 is disposed between the central wall 80 and the outer rib 102. The outer rib 102 has a cam surface 104 which forms a portion of the inner side surface 64 of the lower wall 60. The inner rib 100 and the outer rib 102 define between them a U-shaped channel portion 106 on the inner side surface 64 of the lower wall 60. Together, the channel portions 96 and 106 form a channel 108 (FIG. 2) for receiving the retaining ring 30 in a manner described below.

The end plates 16 and 18 of the housing 12 are located at opposite axial ends of the main body portion 14 of the housing 12. The first end plate 16 includes a planar outer wall 110 (FIG. 1) which extends perpendicular to the axis 42. The outer wall 110 also extends perpendicular to the upper and lower walls 50 and 60 and the central wall 80 of the main body portion 14 of the housing 120 The outer wall 110 has a rear edge portion 112.

A circular fastener opening 114 (FIG. 1) is formed in the outer wall 110 of the first end plate 16. The fastener opening 114 is disposed on the axis 42. Two other fastener openings 116 and 118, smaller in diameter than the fastener opening 114, are also formed in the outer wall 110 of the first end plate 16. Each one of the fastener openings 116 and 118 is spaced rearward from the axis 42, in the direction 32, by the same distance that the channel 108 on the main body portion 14 of the housing 12 is spaced from the axis.

An outer peripheral flange 120 of the first end plate 16 extends axially from the outer wall 110 in a direction toward the second end plate 18. The flange 120 has parallel side portions 122 and 124 and a central portion 126. The central portion 126 of the flange 120 has the same generally arcuate configuration as the central wall 80 of the main body portion 14 of the housing 12.

The second end plate 18 of the housing 12 (FIG. 1) is substantially a mirror image of the first end plate 16. The second end plate 18 includes a planar outer wall 130 which extends perpendicular to the axis 42. The outer wall 130 also extends perpendicular to the upper and lower walls 50 and 60 and the central wall 80 of the main body portion 14 of the housing 12. The outer wall 130 has a rear edge portion 132.

A large circular opening 134 is formed in the outer wall 130 at a location centered on the axis 42. A pair of fastener openings 136 and 138 are also formed in the outer wall 130. The fastener openings 136 and 138 are the same diameter as the fastener openings 116 and 118 in the first end plate 16. Each one of the fastener openings 136 and 138 is spaced rearward from the axis 42, in the direction 32, by the same distance that the fastener openings 116 and 118 in the first end plate 16 are spaced from the axis.

An outer peripheral flange 140 of the second end plate 18 extends axially from the outer wall 110 in a direction toward the first end plate 16. The flange 140 has parallel side portions 142 and 144 and a central portion 146 having the same generally arcuate configuration as the central wall 80 of the main body portion 14 of the housing 12.

The housing 12 has a deployment opening 150 (FIG. 2). The deployment opening 150 is defined by the rear edge portion 56 of the upper wall 50, the rear edge portion 66 of the lower wall 60, and the rear edge portions 112 (FIG. 1) and 132 (FIGS. 1 and 2) of the end plates 16 and 18. The module 10 includes a cover (not shown) for covering the deployment opening 150. The cover, which is preferably made of plastic, closes the deployment opening 150 and conceals the air bag 22 when the air bag is folded and stored in the chamber 40 in the housing 12. The cover is preferably configured as and forms a portion of an instrument panel of the vehicle, which portion is visible to a vehicle occupant.

Figure 4:
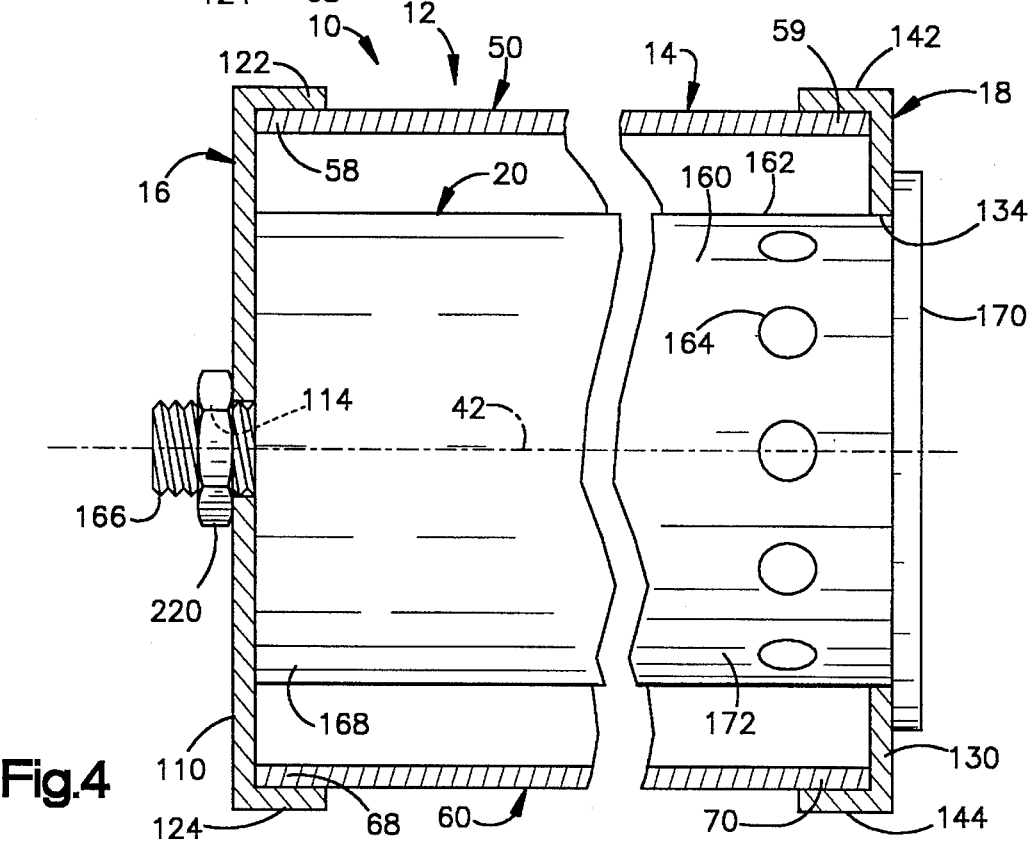
FIG. 4 is a sectional view taken along line 4—4 of FIG. 2 with parts removed.

The inflator 20 (FIGS. 1 and 4) is a known air bag inflator having an elongate cylindrical body 160 with a longitudinal axis which is coincident with the axis 42. The inflator body 160 is slightly smaller in diameter than the large circular opening 134 in the second end plate 18 of the housing 12. The inflator body 160 has a cylindrical outer surface 162 with a plurality of fluid outlets 164 through which inflation fluid is directed, upon actuation of the inflator 20, into the chamber 40 to inflate the air bag 22.

A threaded mounting bolt 166 extends axially from a first end portion 168 of the inflator 20. A radially extending flange 170 is formed at a second end portion 172 of the inflator 20. The flange 170 is larger in diameter than the large circular opening 134 in the second end plate 18 of the housing 12.

Figure 3:
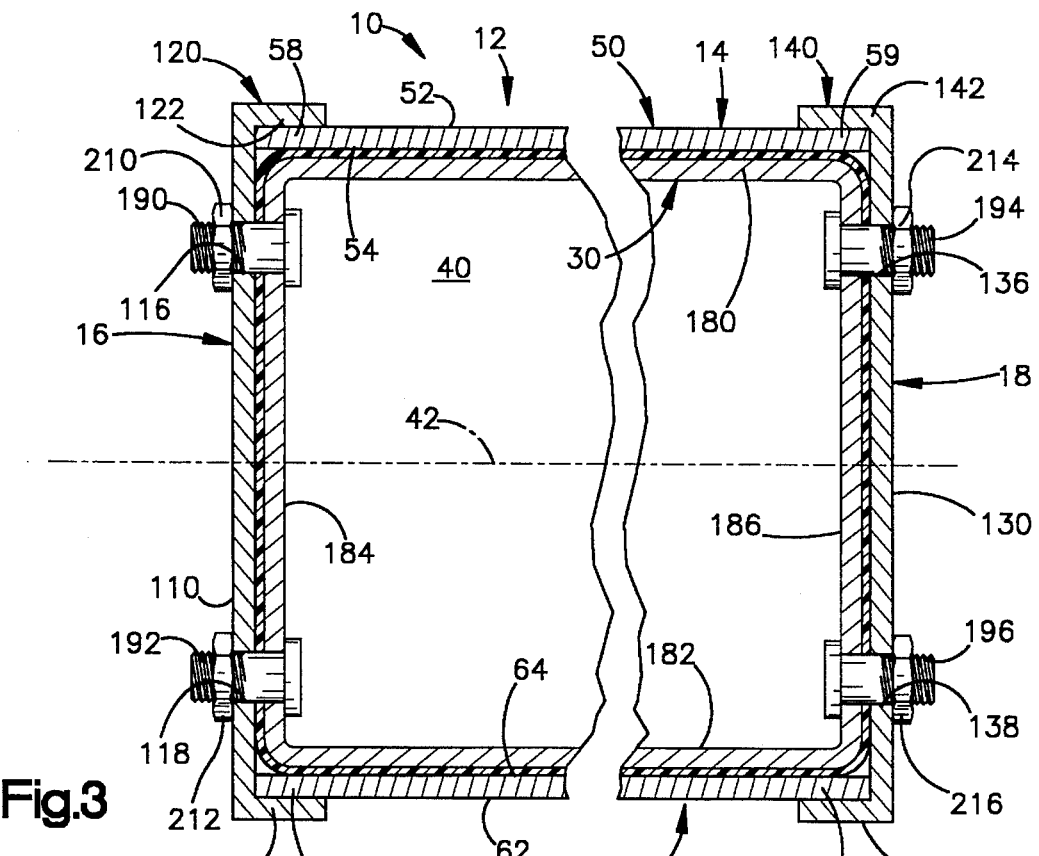
FIG. 3 is a sectional view taken along line 3—3 of FIG. 2 with parts removed.

The retaining ring 30 (FIGS. 1–4) is generally rectangular in overall configuration as viewed from the front or rear of the module 10. The retaining ring 30 is preferably made from sheet metal or as a metal casting. The rectangular configuration of the retaining ring 30 includes upper and lower portions 180 and 182 (FIG. 3) which extend parallel to the axis 42 and parallel to the upper and lower walls 50 and 60 of the main body portion 14 of the housing 12. First and second end portions 184 and 186 of the retaining ring 30 extend perpendicular to and interconnect the upper and lower portions 180 and 182 of the retaining ring. The end portions 184 and 186 of the retaining ring 30 extend parallel to the end plates 16 and 18 of the housing 12 when the retaining ring is assembled in the housing.

A pair of fasteners 190 and 192 (FIGS. 1 and 3) are located on the first end portion 184 of the retaining ring 30. In the illustrated embodiment, the fasteners 190 and 192 are threaded bolts which project axially outward from the first end portion 184 of the retaining ring 30. The spacing between the fasteners 190 and 192 is the same as the spacing between the fastener openings 116 and 118 in the outer wall 110 of the first end plate 16 of the housing 12.

A pair of fasteners 194 and 196 are located on the second end portion 186 of the retaining ring 30. In the illustrated embodiment, the fasteners 194 and 196 are threaded bolts which project axially outward from the second end portion 186 of the retaining ring 30. The fasteners 194 and 196 are preferably identical to the fasteners 190 and 192 on the first end portion 184 of the retaining ring 30. The spacing between the fasteners 194 and 196 is the same as the spacing between the fastener openings 136 and 138 in the outer wall 130 of the second end plate 18 of the housing 12.

The air bag 22 is made from a fabric material, preferably woven nylon. The air bag 22 includes a flap portion 200 having fastener openings (not shown) for connection with the retaining ring 30 in a manner described below. The flap portion 200 of the air bag 22 defines an inflation fluid opening 202 (FIG. 2) for receiving inflation fluid from the inflator 20. The air bag 22 also includes a main body portion 204 which is inflatable through the deployment opening 150 to restrain the vehicle occupant.

The air bag 22 is secured to the retaining ring 30 by inserting the retaining ring into the air bag through the inflation fluid opening 202 so that the flap portion 200 of the air bag extends around the retaining ring as shown in FIGS. 1 and 2. The fasteners 190 and 192 on the first end portion 184 of the retaining ring 30 extend out of the flap portion 200 of the air bag 22 through fastener openings (not shown) in the flap portion of the air bag. The fasteners 194 and 196 on the second end portion 186 of the retaining ring 30 extend out of the flap portion 200 of the air bag 22 through other fastener openings (not shown) in the flap portion of the air bag. The air bag 22 is next folded in a known manner to form a package with the retaining ring 30 as seen in FIG. 1. The assembly of the retaining ring 30 and the air bag 22 is then positioned outside the chamber 40 in the housing 12, adjacent to the deployment opening 150, as shown in FIG. 1.

The retaining ring 30 is moved in the direction 34 through the deployment opening 150 into the chamber 40 in the housing 12. The height (as measured in a direction from top to bottom as viewed in FIG. 2) of the retaining ring 30 with the flap portion 200 of the air bag 22 is less than the distance between the outer ribs 92 and 102 of the main body portion 14 of the housing 12. Thus, the retaining ring 30 is not small enough to move unimpeded through the passage defined between the ribs 92 and 102.

Therefore, as the retaining ring 30 is moved into the housing 12, the upper portion 180 of the retaining ring, enclosed by the flap portion 200 of the air bag 22, engages the cam surface 94 on the outer rib 92 of the upper wall 50 of the main body portion 14 of the housing. At the same time, the lower portion 182 of the retaining ring 30, enclosed by the flap portion 200 of the air bag 22, engages the cam surface 104 on the outer rib 102 of the lower wall 60. The walls 50 and 60 of the main body portion 14 of the housing 12 are resiliently deflected apart as the retaining ring 30 passes in the direction 34 between the ribs 92 and 102. The upper and lower walls 50 and 60 of the main body portion 14 of the housing 12 return to the undeflected position shown in FIG. 2 when the retaining ring 30 moves into the channel 108 in the main body portion of the housing. The inner ribs 90 and 100 limit movement of the retaining ring 30 in the direction 32 so that the retaining ring engages firmly in the channel 108 to interlock the retaining ring 30 with the housing 12.

When the retaining ring 30 is thus interlocked with the housing 12, forward movement of the retaining ring relative to the main body portion 14 of the housing is blocked by engagement of the retaining ring with the inner ribs 90 and 100. Rearward movement of the retaining ring 30 relative to the main body portion 14 of the housing 12 is blocked by engagement of the retaining ring with the outer ribs 92 and 102. Because the retaining ring 30 is interlocked with the main body portion 14 of the housing 12, the flap portion 200 of the air bag 22 is secured in position in the chamber 40 in the housing.

The first end plate 16 is then moved axially into engagement with the main body portion 14 of the housing 12. The bolts 190 and 192 on the first end portion 184 of the retaining ring 30 extend through the fastener openings 116 and 118 in the outer wall portion 114 of the first end plate 16. The outer peripheral flange 120 of the first end plate 16 is disposed radially outward of and is closely fitted around the C-shaped configuration of the main body portion 14 of the housing 12. Thus, the upper side wall 122 of the flange 120 on the first end plate 16 overlies the first end portion 58 of the upper side wall 50 of the main body portion 14 of the housing 12. The lower side wall 124 of the flange 120 overlies the first end portion 68 of the lower side wall 60 of the main body portion 14 of the housing 12. The central portion 126 of the flange 120 overlies the first end portion 86 of the central wall 80 of the main body portion 14 of the housing 12.

The second end plate 18 is also moved axially into engagement with the main body portion 14 of the housing 12, preferably simultaneously with the first end plate 16. The bolts 194 and 196 on the second end portion 186 of the retaining ring 30 extend through the fastener openings 136 and 138 in the outer wall portion 130 of the second end plate 18. The outer peripheral flange 140 of the second end plate 18 is disposed radially outward of and is closely fitted around the C-shaped configuration of the main body portion 14 of the housing 12. Thus, the upper side wall 142 of the flange 140 of the second end plate 18 overlies the second end portion 59 of the upper side wall 50 of the main body portion 14 of the housing 12. The lower side wall 144 of the flange 140 overlies the second end portion 70 of the lower side wall 60 of the main body portion 14 of the housing 12. The central portion 146 of the flange 140 overlies the second end portion of the central wall 80 of the main body portion 14 of the housing 12.

A pair of nuts 210 and 212 (FIGS. 1 and 3) are screwed on the bolts 190 and 192 on the first end portion 184 of the retaining ring 30. The nuts 210 and 212 engage the outer side surface of the outer wall 110 of the first end plate 16. A pair of nuts 214 and 216 are screwed on the bolts 194 and 196 on the second end portion 186 of the retaining ring 30. The nuts 214 and 216 engage the outer side surface of the outer wall 130 of the second end plate 18. The axial length of the main body portion 14 of the housing 12 is selected so that the end plates 16 and 18 are drawn up tight against the main body portion of the housing when the nuts 210–216 are tightened on the bolts 190–196 on the retaining ring 30. Thus, the retaining ring 30 at least partially secures the end plates 16 and 18 to the main body portion 14 of the housing 12.

The inflator 20 is assembled with the housing 12 by moving the inflator axially through the large circular opening 134 in the second end plate 18 and into the chamber 40. The flange 170 on the second end portion 172 of the inflator 20 engages the outer wall 130 of the second end plate 18. At about the same time, the first end portion 168 of the inflator 20 engages the outer wall 110 of the first end plate 16. The mounting bolt 166 on the inflator 20 extends through the opening 114 in the outer wall 110 of the first end plate 16.

A nut 220 (FIGS. 1 and 4) is screwed on the mounting bolt 166 on the inflator 20 and tightened against the outer wall 110 of the first end plate 16. The axial distance between the mounting bolt 166 and the flange 170 on the inflator 20 is selected so that the flange on the inflator is drawn up tight against the outer wall 130 of the second end plate 18 when the nut 220 is tightened on the mounting bolt. Thus, the inflator 20 at least partially secures the end plates 16 and 18 to the main body portion 14 of the housing 12. The inflator 20 and the retaining ring 30 together secure the end plates 16 and to the main body portion 14 of the housing 12. The inflator 20 and the retaining ring 30 together secure the end plates 16 and 18 to the main body portion 14 of the housing 12.

In the event of a vehicle collision, a collision sensor (not shown) of the vehicle causes an electric current to flow through lead wires of the inflator 20 to actuate the inflator. The inflator 20 directs inflation fluid through the fluid outlets 164 into the chamber 40 in the housing 12. The inflation fluid flows from the chamber 40 through the inflation fluid opening 202 into the main body portion 204 of the air bag 22. The main body portion 204 of the air bag 22 inflates and extends rearward from the flap portion 200 in the direction 32 through the deployment opening 150. The air bag 22 moves from the folded and stored condition to an unfolded and inflated condition (not shown) to restrain a vehicle occupant. The interlocking engagement of the retaining ring 30 with the housing 12 retains the flap portion 200 of the air bag 22 in the housing.

Figure 5:
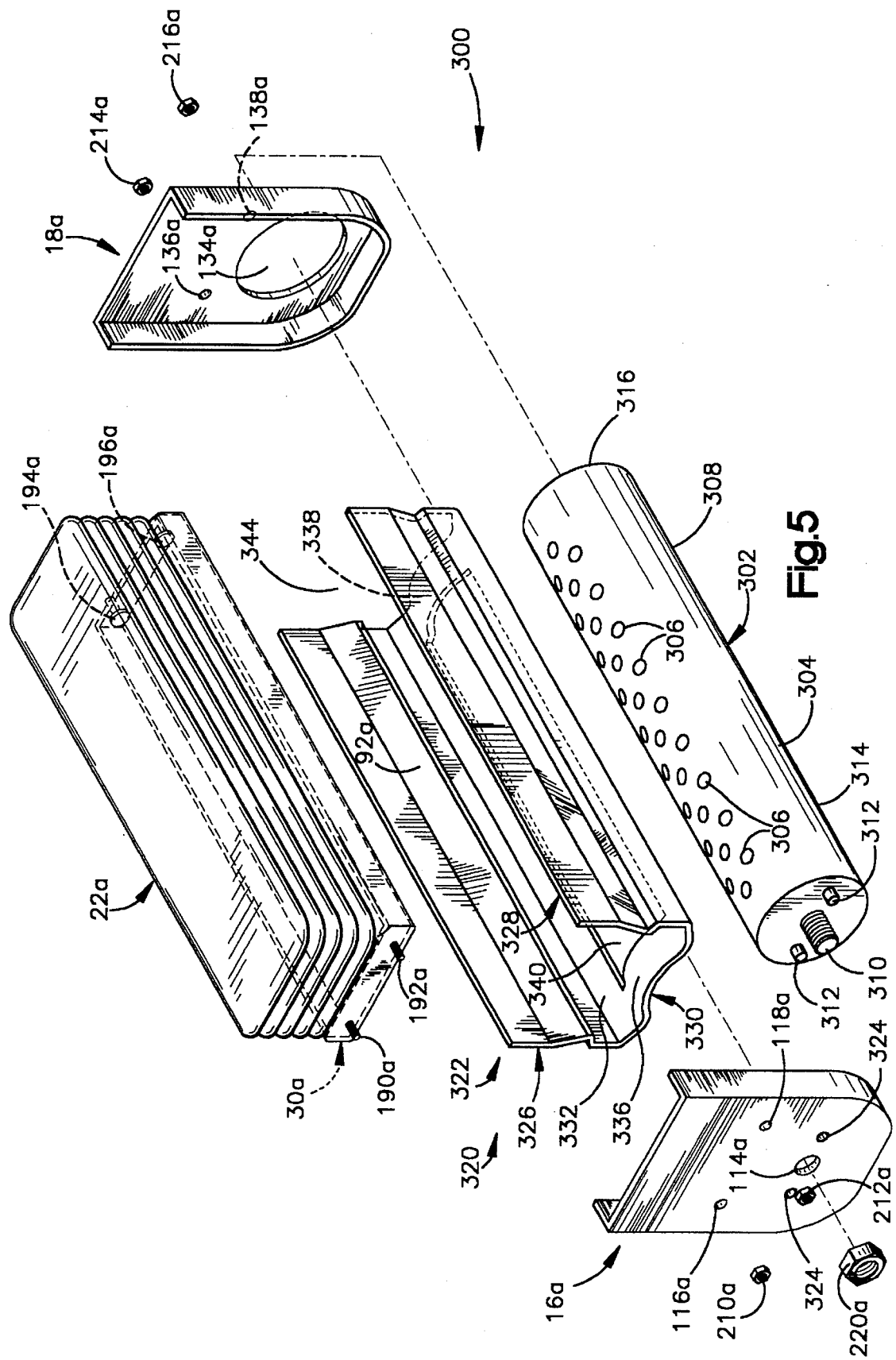
FIG. 5 is a view similar to FIG. 1 showing a vehicle safety apparatus which is constructed in accordance with a second embodiment of the present invention.

FIG. 5 illustrates an air bag module 300 which is constructed in accordance with a second embodiment of the present invention. Parts of the air bag module 300 which are the same as or similar to corresponding parts in the air bag module 10 (FIGS. 1–4) are given the same reference numeral with the suffix "a".

The module 300 includes an air bag 22a and a retaining ring 30a which are identical to the air bag 22 and the retaining ring 30, respectively. The module 300 also includes an inflator 302. The inflator 302 has an elongate cylindrical body 304 including a plurality of fluid outlets 306 disposed along the length of the inflator. The inflator 302 has a cylindrical outer side surface 308. A mounting bolt 310 and two alignment pins 312 project axially from a first end portion 314 of the inflator 302. The second end portion 316 of the inflator 302 does not have a radially extending flange like the flange 170 of the inflator 20.

The module 300 includes a housing 320. The housing 320 includes a main body portion 322 and two end plates 16a and 18a. The end plate 16a is similar to the end plate 16 (FIG. 1) but additionally includes two alignment pin openings 324 for receiving the alignment pins 312 on the inflator 302. The end plate 18a is identical to the end plate 18 (FIG. 1).

The main body portion 322 of the housing 320 has a uniform wall thickness rather than the varying wall thickness seen in the main body portion 14 of the housing 12 of the module 10. The main body portion 322 (FIG. 5) of the housing 320 has a shorter front-to-rear extent than does the main body portion 14 of the housing 12. The main body portion 322 of the housing 320 includes upper and lower side walls 326 and 328 which are interconnected by a central wall 330. The central wall 330 defines the inner end of a channel 332 for receiving the retaining ring 30a.

The inflator 302 is disposed on a side of the central wall 330 which is opposite from the channel 332. The cylindrical outer side surface 308 of the inflator 302 engages two arcuate connector portions 336 and 338 of the central wall 330 of the main body portion 322 of the housing 320. The connector portions 336 and 338 of the central wall 330 define between them an inflation fluid opening 340 in the central wall.

In the assembled air bag module 300, the inflation fluid outlets 306 in the inflator 302 are disposed adjacent to and open into the inflation fluid opening 340 in the central wall 330 of the main body portion 322 of the housing 320. The air bag 22a and the retaining ring 30a are received in a chamber 344 in the housing 320. The chamber 344 is defined by the main body portion 322 and the end plates 16a and 18a of the housing 320. The chamber 344 extends between the end plates 16a and 18a of the housing 320.

The fasteners 190a–196a on the retaining ring 30a secure the end plates 16a and 18a of the housing 320 to the main body portion 322 of the housing. The mounting bolt 310 on the inflator 302 secures the inflator to the end plate 16a of the housing 320. The module 300 may include means (not shown) for radially locating the second end portion 316 of the inflator 302 relative to the second end plate 18a of the housing 320. For example, the second end portion 316 of the inflator 302 may extend through the opening 134a in the second end plate 18a in a manner such that the second end plate supports the second end portion of the inflator. Alternatively, the inflator 302 may include a flange like the flange 170 of the inflator 20 for locating the inflator and securing the end plate 18a of the housing 320.

Figure 6:
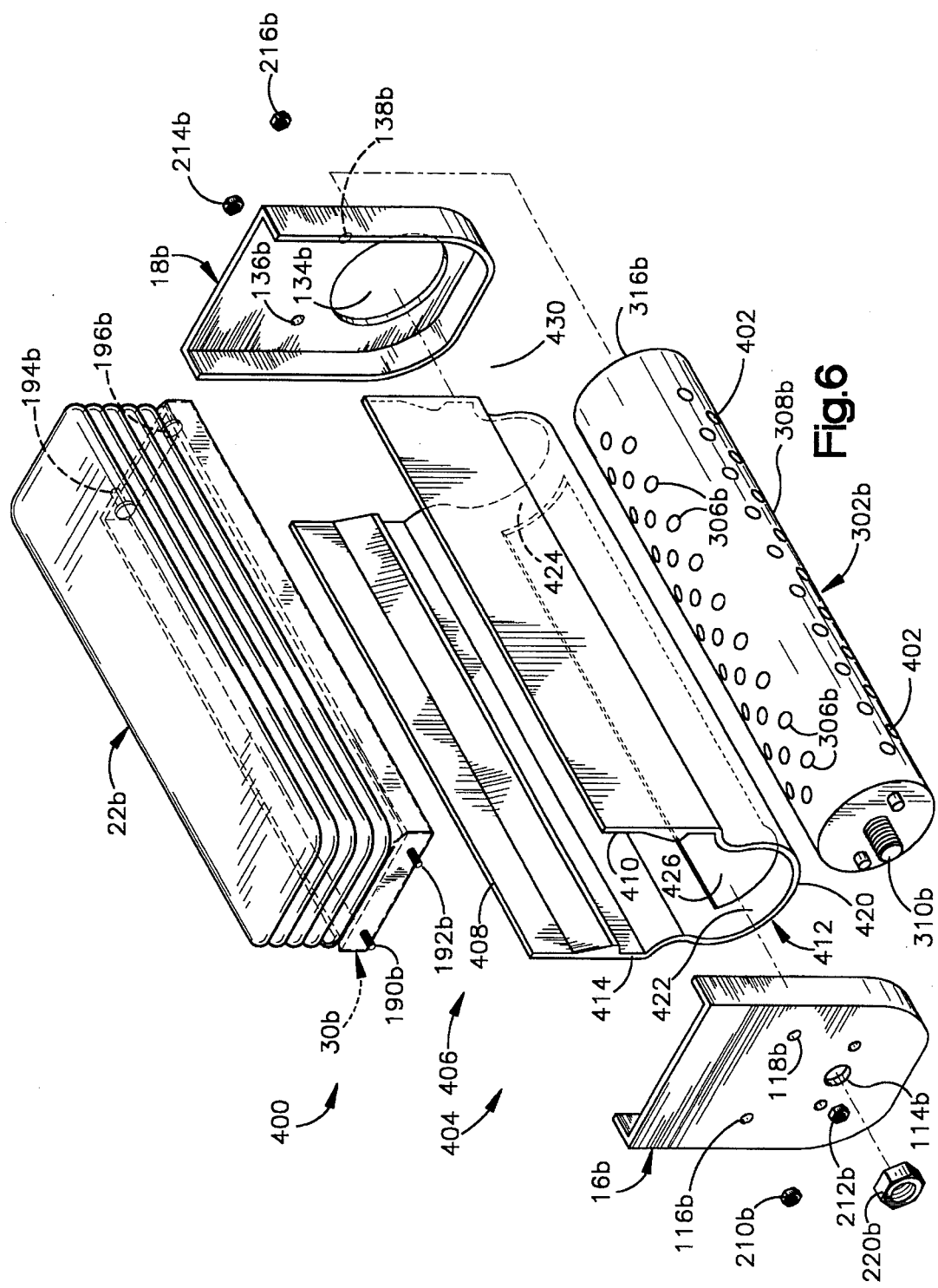
FIG. 6 is a view similar to FIG. 1 showing a vehicle safety apparatus which is constructed in accordance with a third embodiment of the present invention.

FIG. 6 illustrates an air bag module 400 which is constructed in accordance with a third embodiment of the present invention. Parts of the air bag module 400 which are the same as or similar to corresponding parts in the air bag module 10 (FIGS. 1–4) or 300 (FIG. 5) are given the same reference numeral with the suffix "b".

The module 400 includes an air bag 22b and a retaining ring 30b. The module 400 also includes an inflator 302b which has a plurality of vents 402 extending along the length of the inflator and disposed on a side of the inflator which is opposite the inflation fluid outlets 306b.

The module 400 includes a housing 404. The housing 404 includes a main body portion 406 and two end plates 16b and 18b. The main body portion 406 (FIG. 6) of the housing 404 includes upper and lower side walls 408 and 410 which are interconnected by a central wall 412. Part of the central wall 412 defines the inner end of a channel 414 for receiving the retaining ring 30b. The inflator 302b is disposed within an arcuate portion 420 of the central wall 412. The cylindrical outer side surface 308b of the inflator 302b engages two arcuate connector portions 422 and 424 of the central wall 412 of the main body portion 406 of the housing 404. The connector portions 422 and 424 of the central wall 412 define between them a vent opening 426 in the central wall. Vent opening 326 is to vent excessive inflation fluid pressure conducted through the openings 402 in the inflator 302b.

In the assembled air bag module 400, the inflation fluid outlets 306b in the inflator 302b are disposed adjacent to and open into the inflation fluid opening in the air bag 22b. The vents 402 are disposed adjacent to and open into the vent opening 426 in the central wall 412 of the main body portion 406 of the housing 404. The inflator 302b is received, with the air bag 22b and the retaining ring 30b, in a chamber 430 in the housing 404. The chamber 430 is defined by the main body portion 406 and the end plates 16b and 18b of the housing 404. The chamber 430 extends between the end plates 16b and 18b of the housing 404b and includes the space in which the air bag 22b and the inflator 302b are disposed.

The fasteners 190b–196b on the retaining ring 30b secure the end plates 16b and 18b of the housing 404 to the main body portion 406 of the housing. The module 400 may include means (not shown) for radially locating the second end portion 316b of the inflator 302b relative to the second end plate 18b of the housing 404. For example, the second end portion 316b of the inflator 302b may extend through the opening 134b in the second end plate 18b in a manner such that the second end plate supports the second end portion of the inflator. Alternatively, the inflator 302b may include a flange like the flange 170 of the inflator 20 for locating the inflator and securing the end plate 18b of the housing 404.

From the above description of the invention, those skilled in the art will perceive improvements, changes and modifications in the invention. For example, the main body portion 14 of the housing 12 (FIG. 1) or the main body portion 406 of the housing 404 (FIG. 6) could have a uniform wall thickness as seen in the main body portion 322 of the housing 320 (FIG. 5). Such improvements, changes and modifications within the skill of the art are intended to be covered by the appended claims.

Having described the invention, I claim:

1. A vehicle occupant safety apparatus comprising:

a housing including a main body portion and first and second end plates together defining a chamber in said housing, said main body portion of said housing and said end plates together defining a deployment opening in said housing, said housing having an axis extending between said end plates;

an inflatable vehicle occupant restraint in said chamber for, when inflated through said deployment opening, restraining an occupant of a vehicle;

a retainer for securing said inflatable vehicle occupant restraint in said chamber; and an inflator for, when actuated, inflating said inflatable vehicle occupant restraint;

said inflator including first fastener means for securing said inflator to at least one of said end plates of said housing with said inflator disposed between said end plates;

said retainer including second fastener means for securing said end plates to said main body portion of said housing with said retainer disposed between said end plates;

said retainer being connected with said inflatable restraint and being movable with said inflatable restraint through said deployment opening into said chamber in said housing to position said inflatable restraint in said housing between said first and second end plates;

said main body portion of said housing including first and second side walls and a central wall which extends transverse to said first and second side walls and which interconnects said first and second side walls to form a generally C-shaped configuration, said retainer being movable in a direction toward said central wall of said main body portion of said housing through said deployment opening into said chamber in said housing;

said side walls of said main body portion of said housing including surface portions which define a retainer channel in said housing, said retainer being received in said retainer channel in said housing, said surface portions blocking movement of said retainer from said retainer channel; and said side walls of said main body portion of said housing including cam surfaces which define a passage having a height which is less than the height of said retainer, said passage being disposed intermediate said retainer channel and said deployment opening, said retainer engaging said cam surfaces and resiliently deflecting said side walls apart as said retainer moves through said passage into said retainer channel, said side walls returning to an undeflected position when said retainer moves into said retainer channel.

2. A vehicle occupant safety apparatus as set forth in claim 1 wherein said first fastener means on said inflator secures said end plates to said main body portion of said housing with said inflator disposed between said end plates.

3. A vehicle occupant safety apparatus as set forth in claim 2 wherein said inflator has an elongate configuration including first and second opposite end portions, said first fastener means on said inflator comprising a threaded connector on said first end portion of said inflator and a flange on said second end portion of said inflator.

4. A vehicle occupant safety apparatus as set forth in claim 3 wherein said inflator has a cylindrical configuration including a body portion having a first diameter, said flange on said second end portion of said inflator having a second diameter which is larger than said first diameter, said second end plate having an inflator opening with a third diameter which is at least as large as said first diameter and less than said second diameter, said flange being engageable with said second end plate when said body portion of said inflator extends through said inflator opening, said threaded connector on said first end portion of said inflator extending through a first fastener opening in said first end plate.

5. A vehicle occupant safety apparatus as set forth in claim 1 wherein each one of said first and second end plates includes a plurality of second fastener openings, said second fastener means on said retainer comprising a plurality of fasteners projecting from said retainer through said second fastener openings.

6. A vehicle occupant safety apparatus as set forth in claim 5 wherein said fasteners projecting from said retainer comprise threaded bolts extending through said second fastener openings, said apparatus further including a plurality of nuts screwed on said threaded bolts on a respective side of each one of said end plates opposite from said retainer.

7. A vehicle occupant safety apparatus as set forth in claim 1 wherein said retainer comprises a retaining ring having a generally rectangular configuration including first and second main portions and first and second opposite end portions together defining a generally rectangular inflation fluid opening, said second fastener means comprising mounting bolts on said end portions of said retaining ring which project axially in a direction away from said inflation fluid opening.

8. A vehicle occupant safety apparatus comprising:

a housing including a main body portion and first and second end plates together defining a chamber in said housing, said main body portion of said housing and said end plates together defining a deployment opening in said housing, said housing having an axis extending between said end plates;

an inflatable vehicle occupant restraint in said chamber for, when inflated through said deployment opening, restraining an occupant of a vehicle;

a retainer for securing said inflatable vehicle occupant restraint in said chamber; and an inflator for, when actuated, inflating said inflatable vehicle occupant restraint;

said inflator including first fastener means for securing said inflator to at least one of said end plates of said housing with said inflator disposed between said end plates;

said retainer including second fastener means for securing said end plates to said main body portion of said housing with said retainer disposed between said end plates;

said retainer being connected with said inflatable restraint and being movable with said inflatable restraint through said deployment opening into said chamber in said housing to position said inflatable restraint in said housing between said first and second end plates;

wherein said main body portion of said housing includes first and second side walls and a central wall which extends transverse to said first and second side walls and which interconnects said first and second side walls to form a generally C-shaped configuration, said central wall having portions defining an inflation fluid opening in said main body portion of said housing, said central wall extending between said inflator and said retainer, said inflator being disposed outside of said C-shaped configuration of said main body portion of said housing, said inflator having a plurality of inflation fluid outlets which are disposed adjacent to and which open into said inflation fluid opening in said central wall of said housing.

9. A vehicle occupant safety apparatus comprising:

a housing including a main body portion and first and second end plates together defining a chamber in said housing, said main body portion of said housing and said end plates together defining a deployment opening in said housing, said housing having an axis extending between said end plates;

an inflatable vehicle occupant restraint in said chamber for, when inflated through said deployment opening, restraining an occupant of a vehicle;

a retainer for securing said inflatable vehicle occupant restraint in said chamber; and an inflator for, when actuated, inflating said inflatable vehicle occupant restraint;

said inflator including first fastener means for securing said inflator to at least one of said end plates of said housing with said inflator disposed between said end plates;

said retainer including second fastener means for securing said end plates to said main body portion of said housing with said retainer disposed between said end plates;

said retainer being connected with said inflatable restraint and being movable with said inflatable restraint through said deployment opening into said chamber in said housing to position said inflatable restraint in said housing between said first and second end plates;

wherein said main body portion of said housing includes first and second side walls and a central wall which extends transverse to said first and second side walls and which interconnects said first and second side walls to form a generally C-shaped configuration, said central wall having portions defining a vent opening in said main body portion of said housing, said inflator being disposed within said C-shaped configuration of said main body portion of said housing, said inflator having a plurality of vent openings which are disposed adjacent to and which open into said vent opening in said central wall of said housing.

10. A vehicle occupant safety apparatus comprising:

a housing including a main body portion and first and second end plates together defining a chamber in said housing, said main body portion of said housing and said end plates together defining a deployment opening in said housing;

said main body portion of said housing including first and second side walls and a central wall which extends transverse to said first and second side walls and which interconnects said first and second side walls to form a generally C-shaped configuration;

each one of said end plates having fastener openings for securing said end plates to said main body portion of said housing;

an inflatable vehicle occupant restraint in said chamber for, when inflated through said deployment opening, restraining an occupant of a vehicle;

a retainer for securing said inflatable vehicle occupant restraint in said chamber; and an inflator for, when actuated, inflating said inflatable vehicle occupant restraint;

said inflator including first fastener means for securing said inflator to at least one of said end plates of said housing with said inflator disposed between said end plates;

said retainer comprising a retaining ring having a generally rectangular configuration;

said retainer including mounting bolts on said end portions of said retaining ring which project in a first direction away from said inflation fluid opening through said fastener openings in said end plates for securing said end plates to said main body portion of said housing with said retainer disposed between said end plates;

said retainer being connected with said inflatable restraint and being movable with said inflatable restraint in a second direction transverse to said first direction through said deployment opening into said chamber in said housing toward said central wall of said main body portion of said housing to position said inflatable restraint in said housing between said first and second end plates;

said side walls of said main body portion of said housing including surface portions which define a retainer channel in said housing, said retainer being movable into said retainer channel in said second direction and being received in said retainer channel, said surface portions blocking movement of said retainer from said retainer channel in a third direction opposite to said second direction.

11. A vehicle occupant safety apparatus as set forth in claim 10 wherein said first fastener means on said inflator secures said end plates to said main body portion of said housing with said inflator disposed between said end plates.

12. A vehicle occupant safety apparatus as set forth in claim 11 wherein said inflator has an elongate configuration including first and second opposite end portions, said first fastener means on said inflator comprising a threaded connector on said first end portion of said inflator and a flange on said second end portion of said inflator.

13. A vehicle occupant safety apparatus as set forth in claim 12 wherein said inflator has a cylindrical configuration including a body portion having a first diameter, said flange on said second end portion of said inflator having a second diameter which is larger than said first diameter, said second end plate having an inflator opening with a third diameter which is at least as large as said first diameter and less than said second diameter, said flange being engageable with said second end plate when said body portion of said inflator extends through said inflator opening, said threaded connector on said first end portion of said inflator extending through a fastener opening in said first end plate.

* * * * *